V. M. HARRIS.
ALTERNATING CURRENT MOTOR.
APPLICATION FILED MAY 25, 1911.

1,120,615.

Patented Dec. 8, 1914.

Witnesses:
Chas. H. Buell.
Henry Moe.

Inventor:
Varian M. Harris.
by Robert Burns
Atty.

UNITED STATES PATENT OFFICE.

VARIAN M. HARRIS, OF CHICAGO, ILLINOIS, ASSIGNOR, BY MESNE ASSIGNMENTS, TO HENRY S. HAWLEY, TRUSTEE, OF CHICAGO, ILLINOIS.

ALTERNATING-CURRENT MOTOR.

1,120,615.  Specification of Letters Patent.  Patented Dec. 8, 1914.

Application filed May 25, 1911. Serial No. 629,466.

*To all whom it may concern:*

Be it known that I, VARIAN M. HARRIS, a citizen of the United States of America, and a resident of Chicago, in the county of Cook, State of Illinois, have invented certain new and useful Improvements in Alternating-Current Motors, of which the following is a specification.

This invention relates to the synchronous type of alternating current motors, and has for its object to provide a simple and efficient structural formation and combination of parts in said type of motors, and in which with any abnormal variations in the successive impulses of the impressed electromotive force on the line, due to varying self inductance or surgings in said line, the field element of the motor will oscillate in a restricted path concentric with the axis of the rotor to compensate for the differences in the pull between the field and the rotor elements, and attain an approximate synchronism in their operation during the said variations, and prevent a stoppage of the motor certain to occur under the described conditions with the field element held stationary, all as will hereinafter more fully appear.

Figure 1:
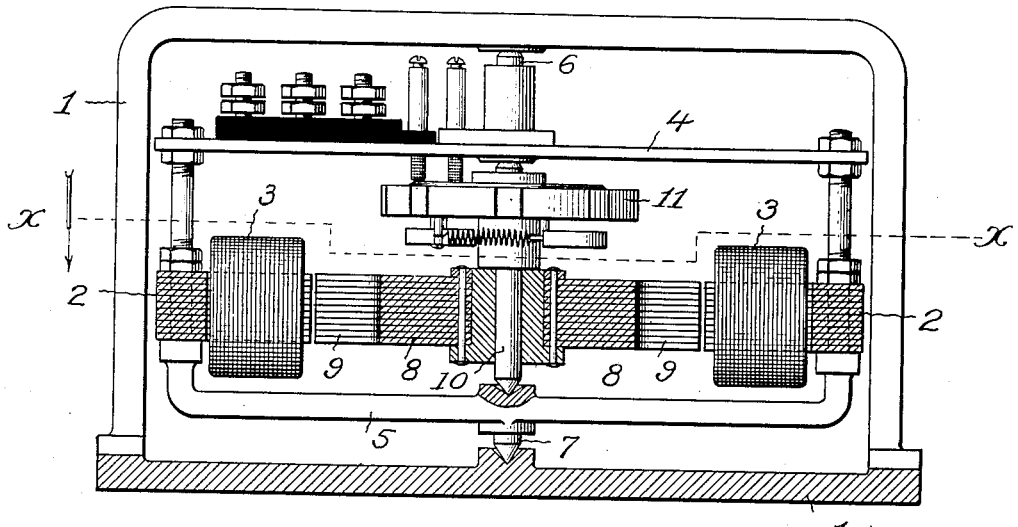
Figure 2:
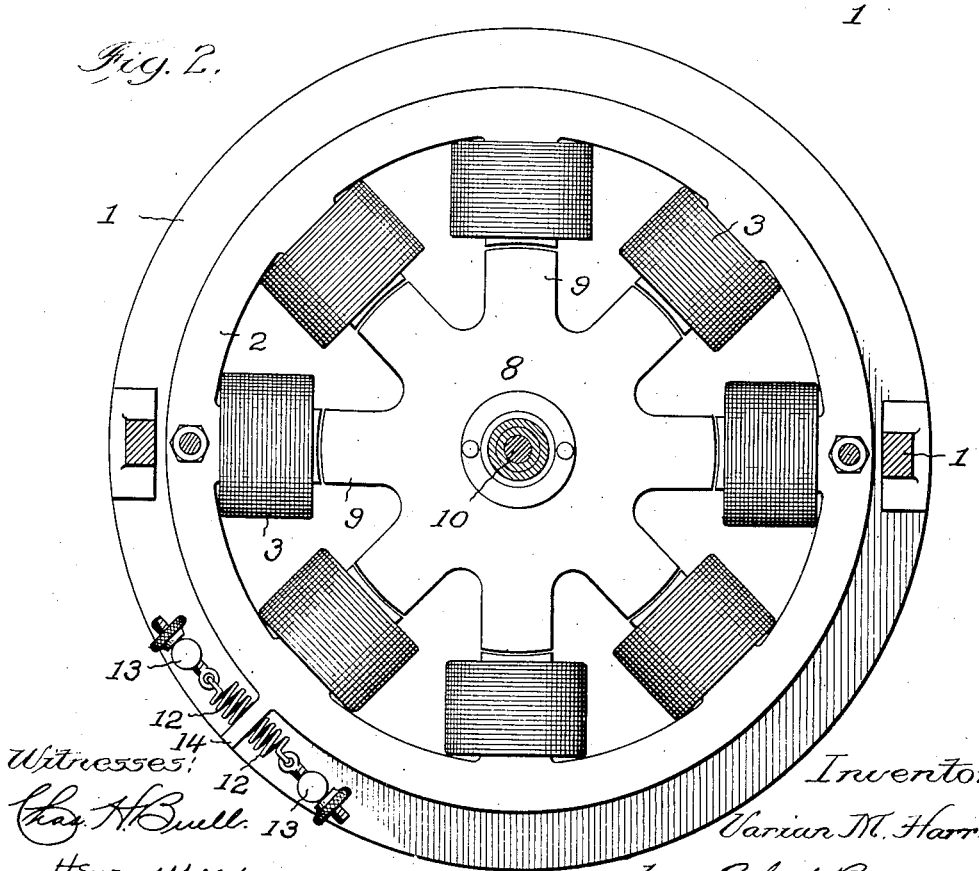

In the accompanying drawings:—Figure 1 is a central sectional elevation of an alternating current motor of the synchronous type, embodying the present invention. Fig. 2, is a horizontal section of the same on lines $x$—$x$, Fig. 1.

Similar reference numerals indicate like parts in both views.

Referring to the drawings, 1 represents the main supporting frame or housing of the motor, of any ordinary and suitable construction and having suitable journal bearings for the motor parts hereinafter described.

2 is the laminated field element of the motor formed with the usual radial pole extensions and upon which are placed the usual coils 3, by which said pole extensions are energized. In the present invention the field element 2 is mounted on the main frame 1 in a manner which permits of its partial rotation in a path concentric with the axis of rotation of the rotor element of the motor, and so that it will be capable of oscillation in said path during the actual operation of the motor hereinafter described in detail.

The above mentioned mounting of the field element in the stationary supporting frame may be effected by any ordinary and suitable formation of the parts which the judgment of the constructor may suggest. In the construction shown in Fig. 1, as illustrative of one form of mounting:—4 and 5 are upper and lower spiders secured to the marginal portion of the field element 2, and having centrally arranged stub-shafts 6 and 7, which in turn engage in suitably formed journal bearings on the stationary supporting frame 1, as shown.

8 is the laminated rotor element comprising the usual radial pole extensions 9 corresponding in number with the pole extensions of the field element 2, and a central hub portion from which said pole extensions 9 radiate. Said central hub portion is in turn mounted on a carrying shaft 10, by which the rotor element is revolubly supported in the main frame 1, and preferably in the indirect manner illustrated in Fig. 1, in which the ends of said shaft 10 are journaled in suitable bearings in the field spiders 4 and 5, in axial and adjacent relation to the bearings of the aforesaid stub-shafts 6 and 7 in the main frame 1. The shaft 10, of the rotor element is adapted to carry in a direct manner, the commutator disk 11 of a current rectifier, as well as the series of contacts and automatic governor of the motor starting mechanism, and also a driving pulley or like element by which the motion of the rotor is transmitted to a mechanism to be driven. In that said auxiliary elements do not constitute novel portions of the present invention, no description of the same in detail need be given.

12 are a pair of opposed springs connected at their outer ends to suitable posts or brackets 13 on the main frame 1, and provided with any suitable means for effecting individual adjustment of the tension of said springs. At their inner ends the springs 12 are attached in any suitable manner to the marginal portion of the field element 2, preferably to a radial arm 14 upon the same, as shown in Fig. 2. Said construction is adapted to permit of a limited oscillation of the field element 2, in a circular path concentric with the axis of revolution of the rotor element, with a return to said field element to a normal position when the temporary electrical stress which caused the oscillation is removed, as set forth in detail in the operation of the apparatus.

The operation of the apparatus is as follows:—With the absence of any electrical surgings in the main line the field element 2 will remain stationary, and will retain such stationary condition during such periods as the torque of the rotor element remains constant. In the ordinary commercial single-phase alternating current line, however, the number of alternations occurring in a given time is seldom constant, and the curves corresponding to the increase and decrease of voltage in the successive waves are subject to considerable variation. With the present invention such abnormal variations in the successive impulses of the electromotive force of the line is very effectively compensated for by the limited oscillation of the field element heretofore described, in that with such abnormal variations the pole faces of the field element will tend to adjust themselves, by a series of oscillations of a progressively decreasing range, so that they are brought to proper positions whereby the rotor is constantly maintained in synchronism with the alternating current of the main line.

Having thus fully described my said invention what I claim as new and desire to secure by Letters Patent, is:—

1. An alternating current synchronous motor, comprising the combination of a stationary support, a field element formed with a series of poles on which are wound coils adapted for connection with a source of alternating current to energize said coils, a rotor element rotatable within said support, the field element being suspended to permit oscillation in a path concentric with the axis of the rotor by variations in the current from said source, whereby the field element is automatically adjusted in such relation with the rotor that the latter is maintained in synchronism with said source of current, and means for retarding the rotation of said field element during operation of said motor, substantially as described.

2. An alternating current synchronous motor, comprising the combination of a stationary support, a field element formed with a series of poles on which are wound coils adapted for connection with a source of alternating current to energize said coils, a rotor element rotatable within said support, the field element being suspended to permit oscillation in a path concentric with the axis of the rotor by variations in the current from said source, whereby the field element is automatically adjusted in such relation with the rotor that the latter is maintained in synchronism with said source of current, and yielding means for returning the field element to a normal position, substantially as described.

3. An alternating current synchronous motor, comprising the combination of a stationary support, a field element formed with a series of poles on which are wound coils adapted for connection with a source of alternating current to energize said coils, a rotor element rotatable within said support, the field element being suspended to permit oscillation in a path concentric with the axis of the rotor by variations in the current from said source, whereby the field element is automatically adjusted in such relation with the rotor that the latter is maintained in synchronism with said source of current, and yielding means for returning the field element to normal position, said means comprising a pair of opposed springs connected at their adjacent ends to said field element and at their remote ends to the stationary support, substantially as described.

4. An alternating current synchronous motor, comprising a rotor, a field element rotatable coaxially with said rotor, whereby said field element adjusts itself to fluctuations in the operating current and the rotor is maintained in synchronism with said current, and means for retarding the rotation of said field element in a direction opposite to the direction of rotation of said rotor during operation of said motor, substantially as described.

5. An alternating current synchronous motor comprising a rotor built up of a plurality of laminæ of magnetic material and formed with a plurality of pole faces, a field element having pole faces thereon, said field element being rotatable and supported coaxially with said rotor, means for exciting the pole faces of said field, and means for retarding the rotation of said field element during operation of said motor, substantially as described.

6. An alternating current synchronous motor comprising the combination of a supporting frame, a rotatable field element supported by said frame and having pole faces thereon, means for exciting the pole faces of said field element from a source of alternating current, and a rotor mounted coaxially with and supported by said field element, substantially as described.

Signed at Chicago, Illinois, this 23rd day of May, 1911.

VARIAN M. HARRIS.

Witnesses:
ROBERT BURNS,
HENRY MOE.